Aug. 30, 1966
H. W. GUETTLER
3,269,438
BARKING DRUM
Filed Oct. 21, 1963
2 Sheets-Sheet 1
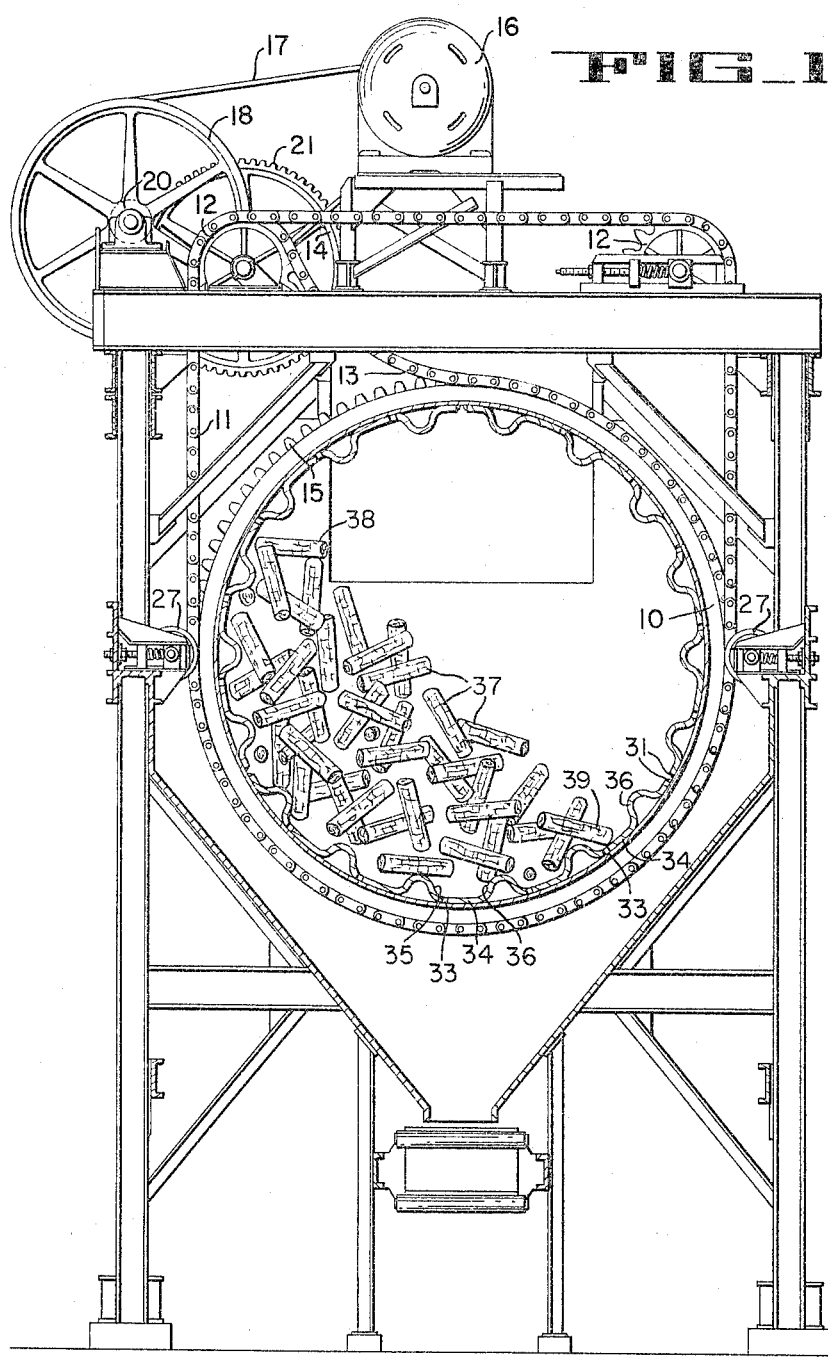
INVENTOR.
HERBERT W. GUETTLER
BY Owen, Wickersham & Erickson
ATTORNEYS Aug. 30, 1966     H. W. GUETTLER     3,269,438
BARKING DRUM
Filed Oct. 21, 1963     2 Sheets-Sheet 2
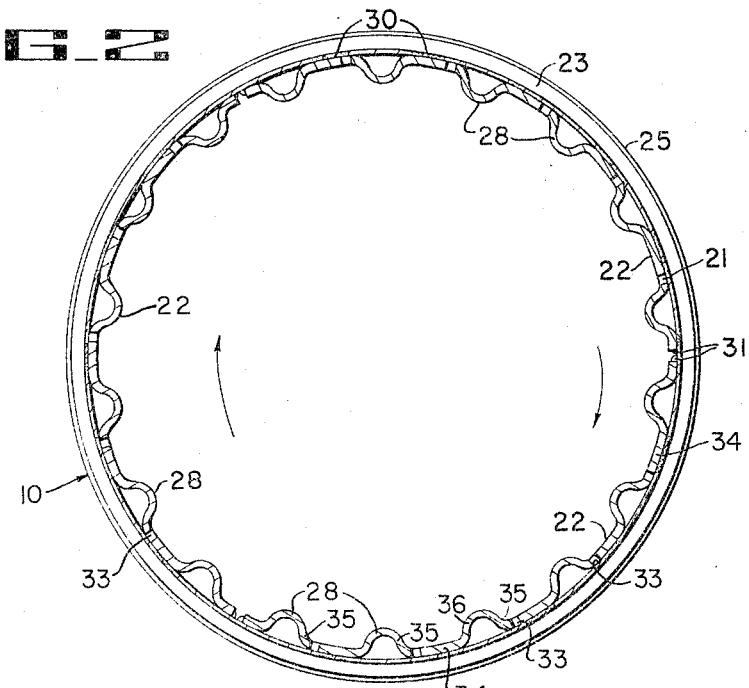
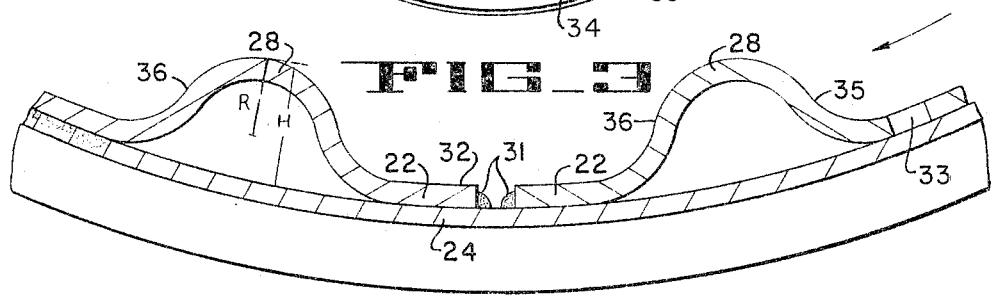
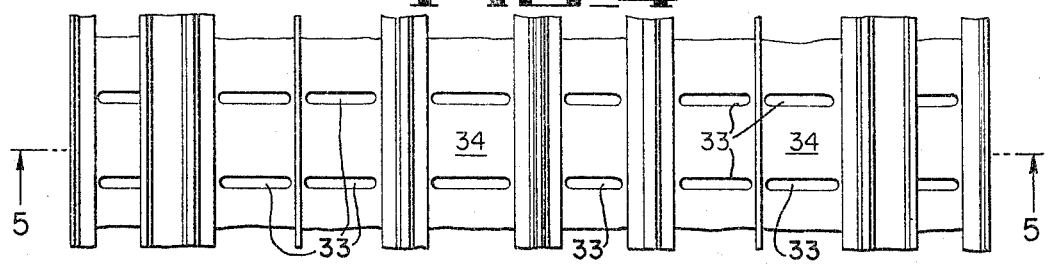
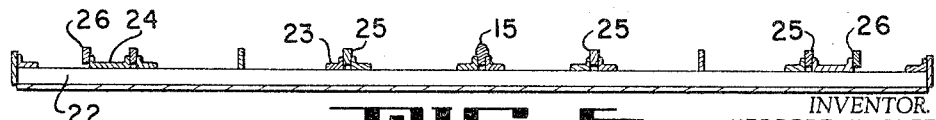
INVENTOR.
HERBERT W. GUETTLER
BY
ATTORNEYS United States Patent Office 3,269,438
Patented August 30, 1966

3,269,438
BARKING DRUM
Herbert W. Guettler, 2901 Vallejo St.,
San Francisco 23, Calif.
Filed Oct. 21, 1963, Ser. No. 317,587
11 Claims. (Cl. 144—208)

This invention relates to improvements in barking drums.

The pulpmaking industry uses large revolving barking drums in order to remove the bark from pulpwood. Logs covered with bark are fed into one end of the drum and are discharged at the other end with the bark removed, principally as a result of the friction between the logs caused by the rotation of the drum.

Since the barking effect is comparatively small per unit length of the drum, the barking drums are made large and long, and their maintenance has been quite expensive. The turning over of the mass of logs causes vibration and shocks that are transmitted to the machinery, the supporting frame, and their foundations. Moreover, the barking is more efficient when the drum rotates at a high speed, and at high speed the stresses become very large because of the weights involved and the motion of the heavy objects.

In most barking drums, numerous longitudinally extending individual barking irons are welded to the inner peripheries of a series of spaced-apart circular rings. Various shapes of barking irons have been employed—U-shaped, M-shaped, etc.—the purpose in all cases being to tumble the logs inside the drum with a minimum of brooming of the ends of the logs. The individual barking irons are normally about 9 to 13 inches wide, and for a 12 foot diameter drum, thirty or more barking irons are required for a drum section. Each iron has been welded to the surrounding rings by two longitudinal welds, which, for a shell 12 feet in diameter and 22½ feet long, amount to 840 feet of welding. A popular size of drum has three such shells, with a total of 2520 feet of welding. All these welds lie on the inside of the shell and are exposed to the tumbling logs.

A major expense factor in the maintenance of these drums has been the welds that secure the longitudinal barking irons to the supporting rings. Since these welds are exposed to the tumbling logs inside the drum, the welds have tended to crack and break after a few months operation, and the constant repair required of these welds has been a big item in the maintenance of a barking drum.

An object of this invention is to reduce the amount of initial welding and to prevent or minimize exposure of the welds to the pounding of the logs. For example, with my invention I have reduced the internal welds exposed to the pounding of the logs from 840 feet to 42 feet in a barking drum shell 12 feet in diameter and 22½ feet long; this I have done by replacing the numerous barking irons by a few—e.g., three—corrugated plate sections, as explained later.

A feature of this invention is that the longitudinal welds inside the drum are below the inside surface of the drum and thus are not exposed directly to the pounding of the logs.

Another important object of this invention is to make the barking drum shell considerably stronger than existing drum shells. This is done by having a continuous plate segment with several corrugations pressed into the plate instead of numerous individual barking irons.

In the drawings:

FIG. 1 is a view in end elevation and partly in section of a barking drum assembly embodying the principles of this invention, the outlet bulkhead being removed.

FIG. 2 is an enlarged view in section of the barking drum cylinder of FIG. 1 showing three corrugated plate segments.

FIG. 3 is a further enlarged fragmentary view, showing the joint between two plate sections.

FIG. 4 is a fragmentary view in side elevation of the drum of FIG. 2.

FIG. 5 is a view in longitudinal section of the barking drum cylinder taken along the line 5—5 in FIG. 4.

In the barking drum assembly shown in FIG. 1, a drum cylinder 10 is suspended by chains 11 which run over idlers 12. The cylinder 10 is caused to rotate by a chain 13 that is driven by a drive sprocket wheel 14, and that transmits this drive to a sprocket ring 15 on the drum 10. The sprocket wheel 14 may be driven from a motor 16 through belts 17, a pulley wheel 18, a pinion 20, and a gear 21 that is secured to the wheel 14.

The drum 10 comprises as few as three longitudinally extending corrugated thick (e.g., 1″) plate segments 22 welded to a series of angle and channel rings 23 and 24. The chains 11 suspend the drum cylinder 10 on support tires 25, the tires 25 being bolted between rings 23 and 24; also guide tires 26 cooperate with guide rolls 27 at each side and each end of the drum cylinder 10 and serve to keep the cylinder 10 steady when it is rotating.

Instead of having numerous individual barking irons, my drum 10 has only three plate segments 22, each with several corrugations 28, six being shown in the drawings. These segments 22 are welded to the supporting rings 23 and 24 by means of outside welds 30 and longitudinal welds 31. The welds 31 are shown in detail in FIG. 3. As will be seen, the welds 31 do not extend up as high as the inner surface 32 of the plate segment 22, so that the welds 31 are not exposed directly to the pounding of the wood.

Openings 33 in the corrugated plate segment 22 are provided for the escape of the bark removed from the logs, supplementing the spaces between segments, the openings 33 taking the place of the spacing between successive irons and enabling the use of the arcuate plate segments 22. In FIG. 2 three plate segments 22 are shown, but more or fewer might also be used. Also, more or fewer corrugations 28 per segment 22 may be used. Since the corrugations 28 are the strongest parts of the shell, and the weakest parts are the cylindrical shell portions 34 in between, I locate the bark slots 33 in the cylindrical plate portions 34 but close to the corrugations 28 rather than spaced midway between them. Further, I locate the slots 33 on the back side 35 of the corrugations 28 in relation to the rotation of the drum 10, the leading side 36 being the front side. The reason for this is that the slots 33 weaken the shell, and the tumbling logs do not hit the bottom at the back side 35 of the corrugations 28 as hard as they hit the bottom of the front side 36.

Comparing the invention with a standard barking drum cylinder, it will be seen that the cylinder 10 in my invention has three segments 22 each with two rows of longitudinal welds 31, or a total of six rows of welds 31, located on the inside of the cylinder 10, while typical prior-art drum cylinders have numerous barking irons, usually from 30 to 44, and each of these irons has two rows of longitudinal inside welds or a total of 60 to 88 rows of inside welds. Thus, the amount of inside welds is reduced from a typical figure of 840 feet to 42 feet. Note also the contrast of the location of each of my welds 31 with the typical prior-art weld on the inside of a barking drum, where the logs 37 are constantly cascading from top 38 to bottom 39 (see FIG. 1) and where most of the cracking of welds is caused by the logs hitting the bare barking irons and the welds. When the welds crack, usually the edges of the barking irons also crack, so that the reduction of edges of the barking iron, in the case from, say, 72 to 6 reduces the repairs of the welds and barking irons considerably.

The present invention makes it possible to construct a heavier and longer lasting drumshell than heretofore. A drum shell segment 22 with several corrugations 28 integral therewith is much stronger and resistant to the heavy shocks from the tumbling logs 37 than a number of individual barking irons covering the same area as the shell segment. Referring to FIG. 1, when the logs 37 cascade from the top 38 of the pile in a revolving drum they hit the drum shell directly at the bottom 39. In the case of the prior-art designs each individual barking iron with its inside welds takes the impact, while in the case of the present invention the impact is distributed over a wide segment.

Referring to FIG. 2 the strength of the shell is in the corrugations 28; the higher they are, the stronger. The height H of the corrugations is greater than the radius R of the upper section, but preferably is less than twice the radius. Since the strength of a beam is directly proportional to its section modulus, which for a corrugation like this increases with the square of the distance of the arc from the center of gravity along the radial line passing through the center of gravity. For example, in the shell twelve feet in diameter referred to earlier, the outside surface of the corrugation may have a radius R of 4¼" while the height H may be 6" and the center of gravity about 3½" from the outside surface along the radial line through the center of gravity.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a barking drum having a rotary cylinder, the improvement wherein said cylinder comprises a plurality of longitudinally spaced rings having radially inner and outer cylindrical surfaces and a plurality of integral plate segments with a maximum of six segments so that each segment covers at least about 60° of arc, each segment having inner and outer surfaces and several longitudinal integral corrugations with bark outlet slots between adjacent corrugations, each segment having two longitudinal edges, each edge being welded to the inner cylindrical surfaces of supporting rings, the plate segments being spaced apart from each other to provide additional bark outlet spaces.

2. The barking drum of claim 1 wherein each said bark outlet slot is located closer to the corrugation which precedes it during rotation of the drum than to the corrugation which follows it during rotation of the drum.

3. The barking drum of claim 1 wherein the ratio of the height of each corrugation to the radius of the top of said corrugation lies between 1:1 and 2:1.

4. The barking drum of claim 1 wherein the longitudinal welds terminate radially beyond the inner surface of the plate segments.

5. In a barking drum, a rotary cylinder comprising a plurality of longitudinally spaced apart rings and three unitary approximately 120° arcuate plate segments, each segment having at least four integral longitudinal corrugations, the plate segments being fastened to the inner side of the rings, the segments being welded on each longitudinal side to the supporting rings to provide six rows of welds, each said plate segment having bark outlet slots between its corrugations.

6. The barking drum of claim 5 wherein each bark slot is located closer to the corrugation which precedes it in rotation than to the corrugation which follows it and is parallel with the corrugations, so that it is next to the trailing side of its adjacent corrugation, in relation to the rotation of the drum.

7. The barking drum of claim 5 wherein the segments are spaced apart from each other circumferentially to provide additional bark outlet means.

8. The barking drum of claim 5 wherein the longitudinal welds terminate radially beyond the inner surface of the plate segments.

9. The barking drum of claim 5 wherein the height of the corrugations from the outside surface of the plate segments to the top of the corrugations is at least 1/12 of the radius of the outside of the plate segments.

10. In a barking drum, a rotary cylinder comprising a plurality of longitudinally spaced apart rings, a plurality of integral plate segments mounted on the inside of said rings and forming a complete circular cylinder with a maximum of six segments, so that each segment covers at least about 60° of arc, each segment having at least three longitudinal integral corrugations, the segments being welded to the edges of the outside rings.

11. The drum of claim 10 having three said integral plate segments, each covering approximately 120° of arc.

References Cited by the Examiner

UNITED STATES PATENTS

| | | | |
|---|---|---|---|
| 1,655,628 | 1/1928 | Royem | 144—208.2 |
| 2,647,548 | 8/1953 | Guettler | 144—208.2 |
| 2,979,090 | 4/1961 | McClay | 144—208.2 |
| 3,020,943 | 2/1962 | Hjartsater | 144—208.2 |

FOREIGN PATENTS 54,315    8/1934    Norway.

HAROLD D. WHITEHEAD, Primary Examiner.

WILLIAM W. DYER, JR., Examiner.